United States Patent [19]

Benter et al.

[11] Patent Number: 4,930,300
[45] Date of Patent: Jun. 5, 1990

[54] LAWN MOWER BATTERY MOUNTING

[75] Inventors: Dean W. Benter, Horicon; James T. Dowe, Beaver Dam, both of Wis.

[73] Assignee: Deere & Company, Moline, Ill.

[21] Appl. No.: 361,017

[22] Filed: Jun. 2, 1989

[51] Int. Cl.⁵ .................... A01D 34/68; A01D 67/00; A01D 73/00
[52] U.S. Cl. .................... 56/16.7; 56/17.5; 56/320.1; 248/302; 248/313
[58] Field of Search ............ 56/16.7, 14.7, 10.6, 56/17.1, 17.2, 17.5, 255, 249, 10.5, 13.3, DIG. 20, DIG. 9, 320.1, 10.1; 248/302, 313, 317

[56] References Cited

U.S. PATENT DOCUMENTS

| | | | |
|---|---|---|---|
| 1,422,028 | 7/1922 | Buedingen | 248/302 X |
| 2,503,859 | 4/1950 | Webber | 248/302 |
| 2,597,735 | 5/1952 | Jepson | 56/10.5 |
| 2,702,448 | 2/1955 | Smith | 56/17.5 X |
| 3,212,244 | 10/1965 | Wilgus | 56/17.1 |
| 3,676,989 | 7/1972 | Slayton | 56/10.5 |
| 3,696,593 | 10/1972 | Thorud et al. | 56/17.5 |
| 3,841,069 | 10/1974 | Weck | 56/10.5 |
| 4,145,864 | 3/1979 | Brewster, jr. | 56/10.2 |
| 4,194,345 | 3/1980 | Pioch et al. | 56/17.5 |
| 4,333,302 | 6/1982 | Thomas et al. | 56/10.5 |
| 4,711,077 | 12/1987 | Kutsukake et al. | 56/17.5 |

OTHER PUBLICATIONS

Author-Deere & Company; Title-John Deere Technical Manual for 21 Inch Walk-Behind Rotary Mowers; 276 pages; Published-Jun. 1987 in Moline, Ill.

Author-The Toro Company; Title-Discover . . . The Limited Edition from Toro; 1 page; Published-1987 in the USA.

Author-American Honda Motor Company, Inc.; Title-Hondo Power Equipment; 2 pages; Published-1984 in the USA.

Author-Homelite Textrom; Title-Homelite Jacobsen Outdoor Power Equipment Catalog; 40 pages; Published-date unknown, in the USA.

Primary Examiner—Stephen J. Novosad

[57] ABSTRACT

A battery mounting is provided for a walk-behind lawn mower. An enclosable compartment houses a battery bracket to suspend the battery within the compartment and protect it from sunlight and moisture. The bracket is composed of resilient rod-like material to clampingly hold the battery in place and avoid friction wear on the battery case.

10 Claims, 3 Drawing Sheets

LAWN MOWER BATTERY MOUNTING

BACKGROUND OF THE INVENTION

1. Field of the Invention

The present invention relates generally to lawn mowers and more specifically to electrically-started walk-behind lawn mowers.

2. Description of the Prior Art

Walk-behind lawn mowers are commonly equipped with pull-type recoil starters for starting the engine. For some applications, however, it is desirable to provide the engine with an electric start capability. Accordingly, a battery must be provided on the mower to power the electrical start mechanism.

Many of today's walk-behind lawn mowers equipped with batteries for electric start capability carry the battery on the housing of the lawn mower. The battery may be exposed or encased in a plastic cover to protect it against moisture and sunlight. If the battery is not encased, it is directly exposed to the sun's rays which can promote self-discharge, that is, leaking of the battery's electrical charge to its ground connection. Further, exposed batteries are directly subjected to moisture and rain which can cause the battery to short out and/or cause corrosion of the metallic parts of the battery. If the battery is encased in a plastic cover, the ultraviolet sunlight will, over time, cause the cover to degrade, exposing the battery to moisture and sunlight.

Therefore, it is desirable to provide a mounting for a battery on a walk-behind lawn mower which avoids the above problems. Ideally, it would be desirable to provide a battery mounting compartment wherein the battery would be protected from the sunlight and exposure to moisture.

SUMMARY OF THE INVENTION

The present invention provides for a compartment to be provided in the housing of a walk-behind lawn mower. The compartment is further provided with a cover so that the battery when placed in the compartment is protected from sunlight and exposure to moisture. A unique wire bracket or hanger is provided for mounting the battery in the compartment. The bracket is carried on the side of the compartment and suspends the battery along the side and back walls of the compartment. The spring wire bracket is resilient so as to support the battery and clamp it firmly in place.

DESCRIPTION OF THE PREFERRED EMBODIMENT

Figure 1:
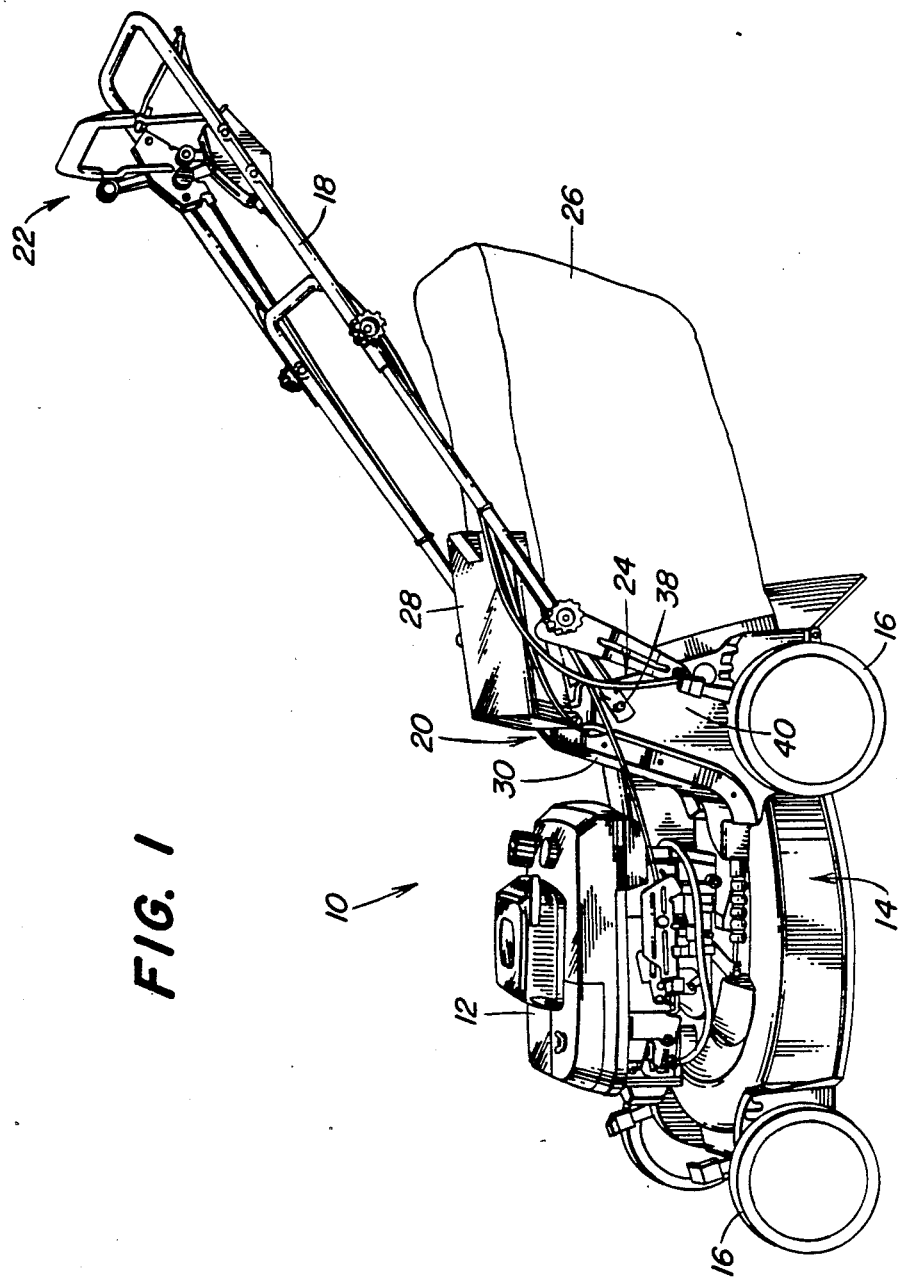
FIG. 1 is an elevational perspective view of a lawn mower equipped with such a compartment and battery mount.

Referring now to the drawings generally, and to FIG. 1 specifically, there is illustrated a walk-behind lawn mower 10 having an engine 12 mounted on a housing 14 carried by wheels 16. A handle 18 is connected to the rear portion 20 of the housing 14. The handle 18 is equipped with controls 22 for operating the engine and cutting blade.

The housing 14 is provided at its rearward end with an upwardly extending portion 20. This portion 20 includes a rear wall 24 through which the grass is discharged into a grass catcher 26. A spring-loaded cover 28 is provided at the top of the rear portion 20 and biased downwardly to engage the opening in the rear wall 24 of the housing 14 when the grass catcher 26 is removed.

Figure 2:
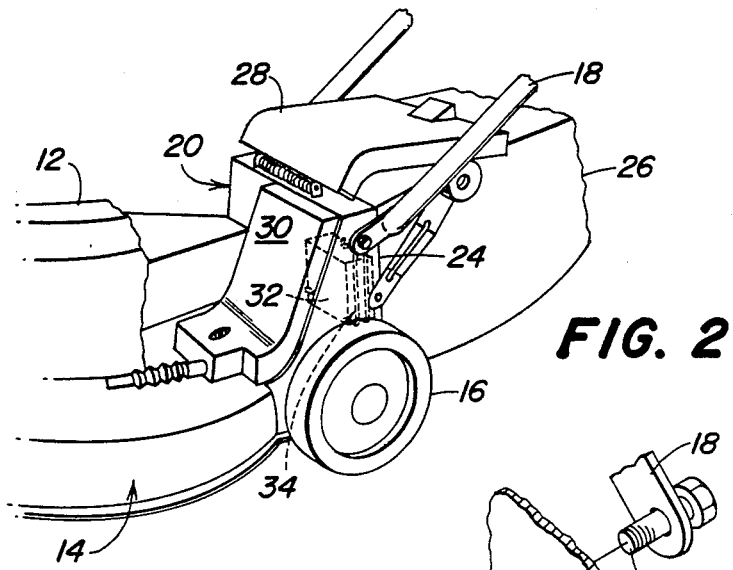
FIG. 2 is a front elevational and partial view of the battery compartment illustrating the battery in phantom.
Figure 3:
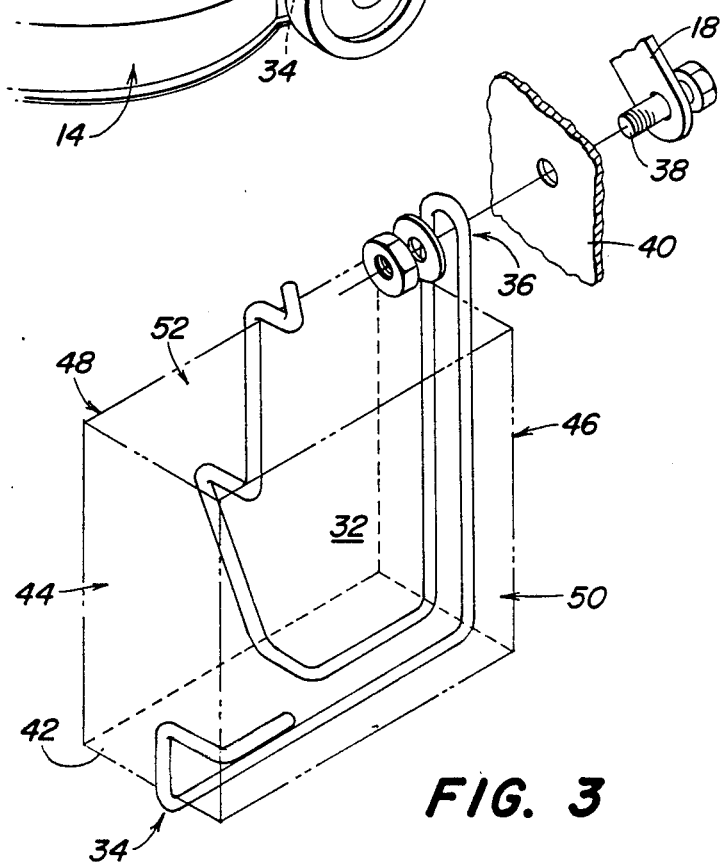
FIG. 3 is an enlarged perspective view of the mounting bracket illustrating in phantom the position of the battery in relation to its mount.
Figure 4:
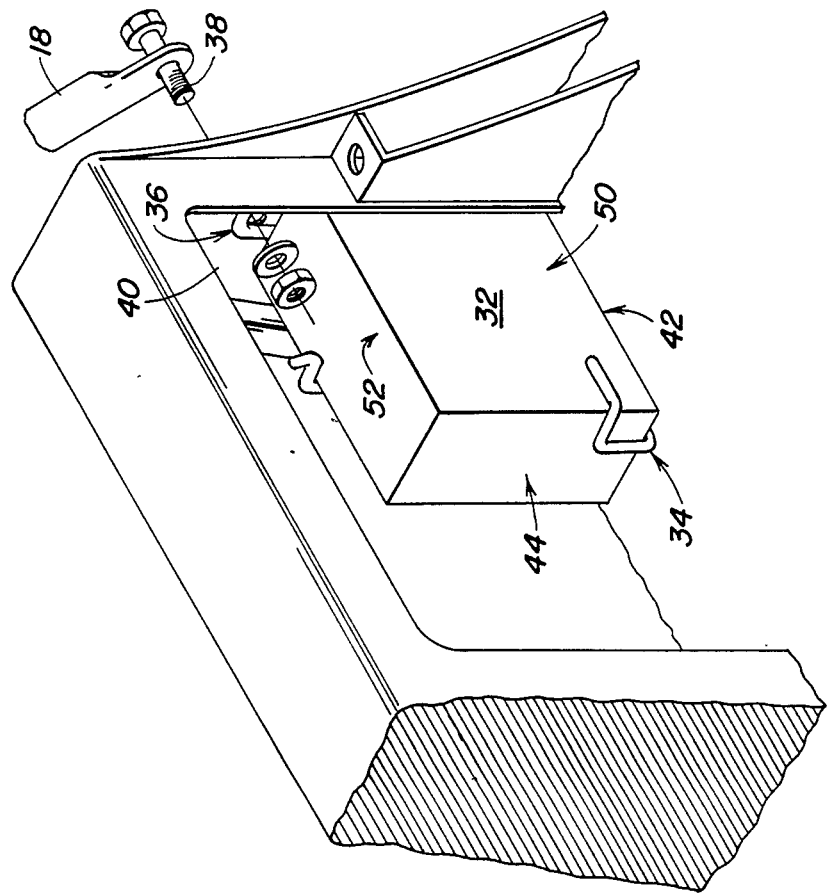
FIG. 4 is an enlarged partial perspective view of the battery secured in the compartment.

At the forward edge of the rear portion 20 is a cover 30 which encloses the compartment wherein the battery 32 is contained. Looking now to FIGS. 2, 3 and 4 wherein the compartment is better illustrated, there is shown a battery 32 suspended on a mounting bracket 34. The bracket 34 is formed of a rod or wire-like structure that is not only simple and inexpensive to manufacture and install, but also resilient so that it clamps the battery 32 securely in place. The bracket 34 includes a loop 36 through which a bolt 38 or similar means can pass to mount it to the compartment wall 40. In the preferred embodiment, the handle bolt 38 is used to mount the bracket 34 to the wall 40.

The wire-like bracket 34 is configured to support the battery 32 along its lower surface 42 since the compartment has no bottom surface and also contact the battery's two side surfaces 44 and 46, rear surface 48, front surface 50, and top surface 52. The bracket is spring-loaded and clamps the battery 32 firmly in place to prevent rubbing of the bracket 34 against the battery walls as the mower 10 is moved over rough ground. The spring-loaded feature further prevents the battery from working loose from the bracket mounting and from incurring friction wear holes in its casement.

The rod-like bracket 34 is easily mounted to the inside compartment by removing the bolt 38 which holds the rearwardly extending push handle 18 to the mower housing. Once installed, the bracket 34 permits simple insertion and removal of the battery 32. Its spring-loaded nature permits the operator to easily snap the battery 32 into place. Its location places the battery 32 close to the engine 12, thereby requiring short electrical lead wires and minimizing voltage loss through the wires. No extra mounting structures other than the inexpensive bracket 34 are required to carry the battery 32 or insulate it from the elements.

With the present mounting structure, a battery 32 is easily mounted as an option, either during manufacture of the walk-behind lawn mower or subsequent to purchase by the operator as a consumer-installed option. The compartment and bracket 34 protect the battery 32 and its plastic case against sun contact and exposure to moisture to preserve the battery case and avoid leakage or draining of the battery charge to its ground.

We claim:

1. In a walk behind mower having a housing supported by ground engaging wheels, an engine carried on the housing and drivingly connected to a cutting blade, and means for electrically starting the engine, the improvement comprising:
   a compartment formed in the housing;
   a bracket carried in the compartment, said bracket including rod-like members;
   a battery mountable in the bracket and being supported by the rod-like members on at least the bottom and one side thereof, said battery adapted to be connected to the means for electrically starting the engine.

2. The invention defined in claim 1 wherein the bracket is comprised of resilient rod-like material and shaped to engage the battery on at least four of its sides.

3. The invention defined in claim 1 wherein the bracket is comprised of rod-like material and shaped to form a box-like receptacle for the battery.

4. The invention defined in claim 3 wherein the sides of the box-like receptacle are resiliently biased inwardly so as to clampingly secure the battery in the receptacle.

5. The invention defined in claim 1 wherein the rod-like members support the battery at its bottom and at least two side surfaces.

6. The invention defined in claim 1 wherein the rod-like members are comprised of resilient material.

7. In a walk behind lawn mower having a housing supported by ground engaging wheels, an engine carried on the housing and drivingly connected to a cutting blade, and means for electrically starting the engine, the improvement comprising:

a compartment formed in the housing;

a bracket carried in the compartment, said bracket being composed of resilient rod-like material;

a battery mountable in the bracket and having at least four of its sides engaged by the bracket, the battery being adapted to be connected to the means for electrically starting the engine.

8. The invention defined in claim 7 wherein the bracket takes the form of a box-like receptacle for the battery.

9. The invention defined in claim 8 wherein the sides of the box-like receptacle are resiliently biased inwardly so as to clampingly secure the battery in the receptacle.

10. For use in a walk behind lawn mower having a housing supported by ground engaging wheels, a compartment formed in the housing, an engine carried on the housing and drivingly connected to a cutting blade, a battery, means for electrically starting the engine, and an improved bracket comprising resilient rod-like members carried in the compartment, said members being shaped to support and engage the battery on at least two of its sides.

* * * * *